United States Patent
Koh et al.

(10) Patent No.: US 10,827,449 B2
(45) Date of Patent: Nov. 3, 2020

(54) COMMUNICATION APPARATUS AND COMMUNICATION METHOD

(71) Applicant: Panasonic Corporation, Kadoma-shi, Osaka (JP)

(72) Inventors: Benjamin Tien Ming Koh, Singapore (SG); Shozo Okasaka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 16/447,362

(22) Filed: Jun. 20, 2019

(65) Prior Publication Data

US 2019/0306822 A1    Oct. 3, 2019

Related U.S. Application Data

(63) Continuation of application No. PCT/JP2016/088187, filed on Dec. 21, 2016.

(51) Int. Cl.
| | |
|---|---|
| *H04W 4/00* | (2018.01) |
| *H04W 60/00* | (2009.01) |
| *H04W 76/15* | (2018.01) |
| *H04L 29/12* | (2006.01) |
| *H04W 8/04* | (2009.01) |
| *H04W 8/20* | (2009.01) |
| *H04W 8/26* | (2009.01) |

(52) U.S. Cl.
CPC ....... *H04W 60/005* (2013.01); *H04L 61/1588* (2013.01); *H04W 8/04* (2013.01); *H04W 8/205* (2013.01); *H04W 8/26* (2013.01); *H04W 76/15* (2018.02)

(58) Field of Classification Search
CPC ........... H04W 60/04–06; H04W 48/16; H04W 36/0022; H04W 8/22
See application file for complete search history.

(56) References Cited

U.S. PATENT DOCUMENTS

| | | |
|---|---|---|
| 9,008,654 B2 | 4/2015 | Sachanandani |
| 9,084,147 B2 | 7/2015 | Ahmavaara |

(Continued)

FOREIGN PATENT DOCUMENTS

WO    WO-2018143774 A1 *  8/2018  .............. H04W 8/02

OTHER PUBLICATIONS

3GPP TS 23.401 "3rd Generation Partnership Project; Technical Specification Group Services and System Aspects; General Packet Radio Service (GPRS) enhancements for Evolved Universal Terrestrial Radio Access Network (E-UTRAN) access (Release 14)."

*Primary Examiner* — Charles T Shedrick
(74) *Attorney, Agent, or Firm* — Seed IP Law Group LLP

(57) ABSTRACT

This invention describes a method to enable simultaneous connections to multiple cellular networks while utilising only a single subscriber identity by assigning a unique mobile equipment identity to each radio connection and an apparatus to enable simultaneous connections to multiple cellular networks while utilising only a single subscriber identity by assigning a unique mobile equipment identity to each radio connection where the user equipment is able to manage the multiple International Mobile Equipment Identifiers assigned by the manufacturer of the mobile device by correctly identifying the connected interface and reporting the correct accompanying mobile equipment identifier.

9 Claims, 4 Drawing Sheets

(56) References Cited

U.S. PATENT DOCUMENTS

| | | | |
|---|---|---|---|
| 2009/0055899 A1* | 2/2009 | Deshpande | H04W 36/0022 726/4 |
| 2012/0008551 A1* | 1/2012 | Giaretta | H04W 36/0011 370/328 |
| 2013/0150041 A1* | 6/2013 | Shaheen | H04W 36/0016 455/436 |
| 2014/0194118 A1* | 7/2014 | Liu | H04W 36/18 455/435.1 |
| 2014/0376511 A1* | 12/2014 | Kalapatapu | H04W 36/18 370/331 |
| 2016/0183178 A1* | 6/2016 | Marimuthu | H04W 4/023 455/432.1 |
| 2018/0270781 A1* | 9/2018 | Baek | H04W 60/06 |
| 2018/0376384 A1* | 12/2018 | Youn | H04W 36/0022 |
| 2019/0037448 A1* | 1/2019 | Shan | H04W 28/22 |
| 2019/0059067 A1* | 2/2019 | Lee | H04W 60/04 |
| 2019/0098547 A1* | 3/2019 | Chong | H04W 36/12 |
| 2019/0150081 A1* | 5/2019 | Qiao | H04W 60/005 370/329 |
| 2019/0159158 A1* | 5/2019 | Kang | H04W 60/06 |

\* cited by examiner

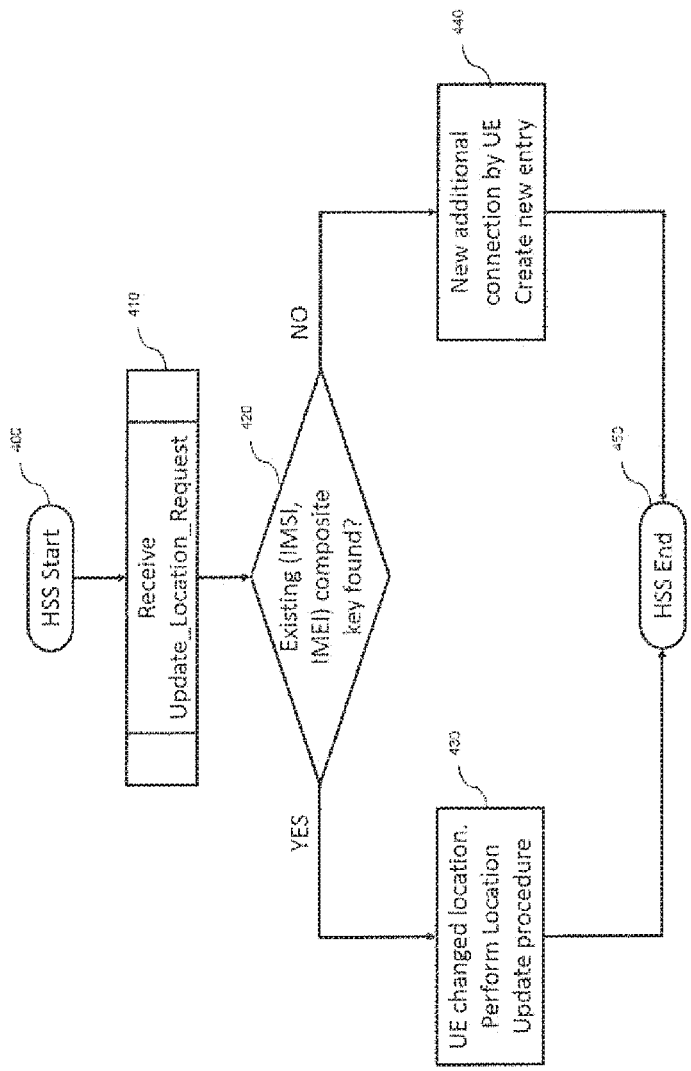

COMMUNICATION APPARATUS AND COMMUNICATION METHOD

TECHNICAL FIELD

The present disclosure generally pertains to a communication apparatus such as a terminal apparatus capable of simultaneous connection with multiple base stations. More specifically, it relates to the operation of terminal apparatus a terminal apparatus that simultaneously connects to multiple networks in a visited network scenario when utilizing a single SIM.

BACKGROUND ART

In recent days, urban environment is dense with overlapping coverage of ubiquitous communication wireless networks.

Heterogeneous digital radio networks of varying capability, range and usage pepper the typical urban landscape. Amongst the most notable include the 3GPP defined networks (including GSM, UMTS and LTE) used for cellular communications.

With the widespread proliferation of smartphones, consumer expectations of ubiquitous high speed connectivity and intense competition amongst service providers, it is a common sight for multiple base stations from competing providers to cover the same geographic areas. Furthermore, competition for visiting (roaming) customers is also heating up with providers offering a wide variety of packages and promotions.

It is hence foreseeable that roaming visitors may soon have a selection of choices for visited networks offering a variety of perks and packages catered for different usages. It may therefore be advantageous for a discerning consumer to mix and match between the various rates and perks offered by the local providers. An example may include exclusive content services from provider A while utilising provider B for preferential voice call rates. A technical difficulty in utilising the best of both worlds by simultaneously connecting to both operators lies in the fact that the subscriber handset is typically only equipped with a single SIM (Subscriber Identity Module) card from his home provider.

Earlier teachings such as PLT 1 proposes an additional Authentication and Authorization server to supplement the security authentication for simultaneous connectivity when utilizing handsets equipped with a single SIM card. This method requires the setting up a new dedicated server entity and the associated maintenance and operation costs.

Another similar teaching PLT 2 uses a special SIM card that is able to switch between home and visited IMSI (International Mobile Subscriber Identity) based on detected broadcasts by the local base stations. However, this switching may not be seamless to the consumer and it also does not support the simultaneous multiple provider base station connections.

CITATION LIST

Patent Literature

[PTL 1]
U.S. Pat. No. 9,084,147 B2
[PTL 2]
U.S. Pat. No. 9,008,654 B2

Non Patent Literature

[NPL 1]
3GPP TS 23.401 "GPRS Enhancements for E-UTRAN Access"

SUMMARY OF INVENTION

In one general aspect, the techniques disclosed here feature: the Home Subscriber Server (HSS) and user equipment (UE) that allows the roaming UE to simultaneously connect to multiple visited mobile networks using a single SIM card. This is achieved by the UE assigning a different, unique International Mobile Equipment Identifier (IMEI) for each communications interface and allowing the HSS to tie these to an International Mobile Subscriber Identity (IMSI).

It should be noted that general or specific disclosures may be implemented as a system, a method, an integrated circuit, a computer program, a storage medium, or any selective combination thereof.

Advantageous Effects of Invention

It is an object of the invention to solve the above discussed problems. In particular, this invention teaches a way to for user equipment with multiple connection capabilities to simultaneously connect to multiple visited mobile networks when roaming outside home network coverage by utilising only a single SIM card.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 4 shows a flowchart for the behaviour of Home Subscriber Server.

DESCRIPTION OF EMBODIMENTS

Various embodiments of the present disclosure will now be described in detail with reference to the annexed drawings. In the following description, a detailed description of known functions and configurations has been omitted for clarity and conciseness.

(Basis of the Present Disclosure)

In the following description, for the purpose of explanation, specific numbers, times, structures, protocols, and other parameters are set forth in order to provide a thorough understanding of the present invention. However, it will be apparent to anyone skilled in the art that the present invention may be practiced without these specific details. It should also be noted that the same mechanism will work with both SIM and USIM (UMTS Subscriber Identity Module) cards. For clarification, these two terms are used interchangeably in the following description.

Embodiment 1

In the following description of the preferred embodiment, reference is made to the accompanying drawings from which the invention may be practiced.

Figure 1:
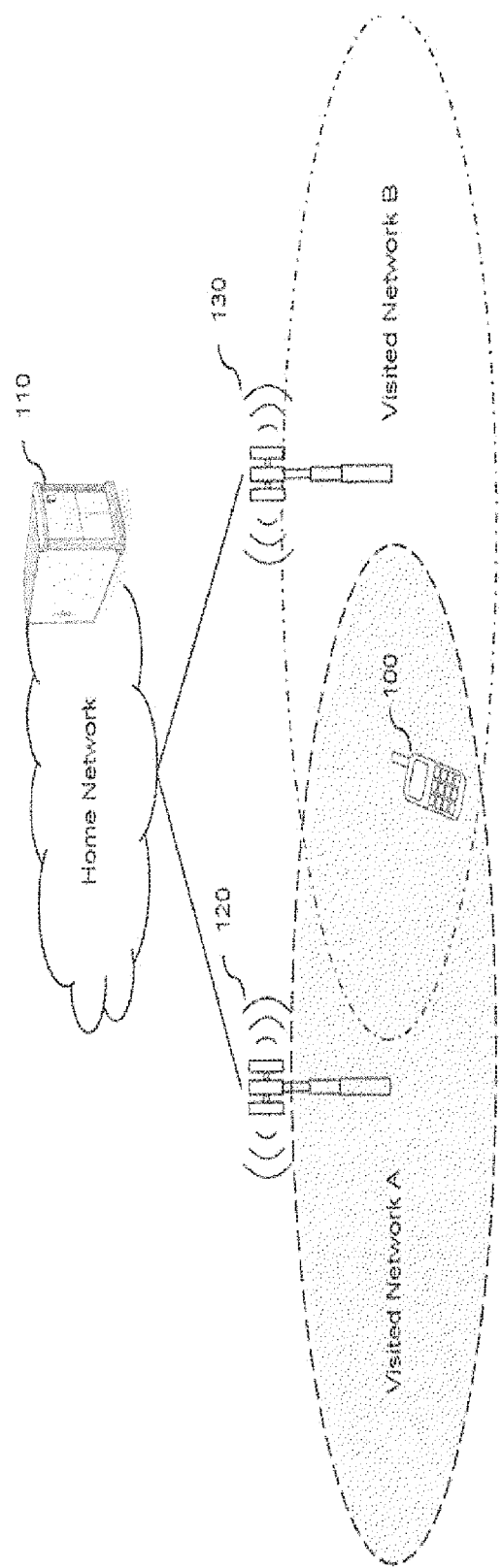
FIG. 1 depicts the scenario in which the solution takes place.

FIG. 1 shows the typical network scenario in which the invention operates. UE 100 is a handset that is capable of simultaneous 3GPP radio connections with two (or more) base stations via two (or more) radio interfaces. Each radio interface has been assigned a unique IMEI number, the exemplary implementation is for the manufacturer to assign a unique number from its pool of six-digit serial number to each interface. Hence, UE 100 may have IMEI numbers AA-BBBBBB-(CCCCCC)-D and AA-BBBBBB-(CCCCCC+1)-D where AA-BBBBBB is the Type Allocation Code (TAC) assigned by GSMA for each wireless device model, CCCCCC is the manufacturer assigned serial number for a particular model and D is the Luhn checksum used for detecting errors. In some implementations, an IMEISV is used in place of the IMEI.

In this case, the IMEISV is of the format AA-BBBBBB-CCCCCC-EE where EE is the software version number and the rest are identical to the IMEI. For the purpose of this description, UE 100 has been issued with IMEI.A and IMEI.B for each radio interface respectively.

In FIG. 1, UE 100 is subscribed to the Home Network and has its particulars stored in the Home Subscriber Server (HSS) 110. The Home Subscriber Server is an entity in 3GPP envisioned as a central database that contains user-related and subscription-related information. The functions of the HSS include functionalities such as mobility management, call and session establishment support, user authentication and access authorization. The prime key for data that is stored in the HSS is the IMSI of the subscriber which is stored in the SIM card. The IMEI/IMEISV is one of the fields that make up the subscriber data. For HSS 110 that implements the described invention, the IMSI and the IMEI/IMEISV will together form a composite key that specifies that fields that will describe the connection for the specified radio interface.

Figure 2:
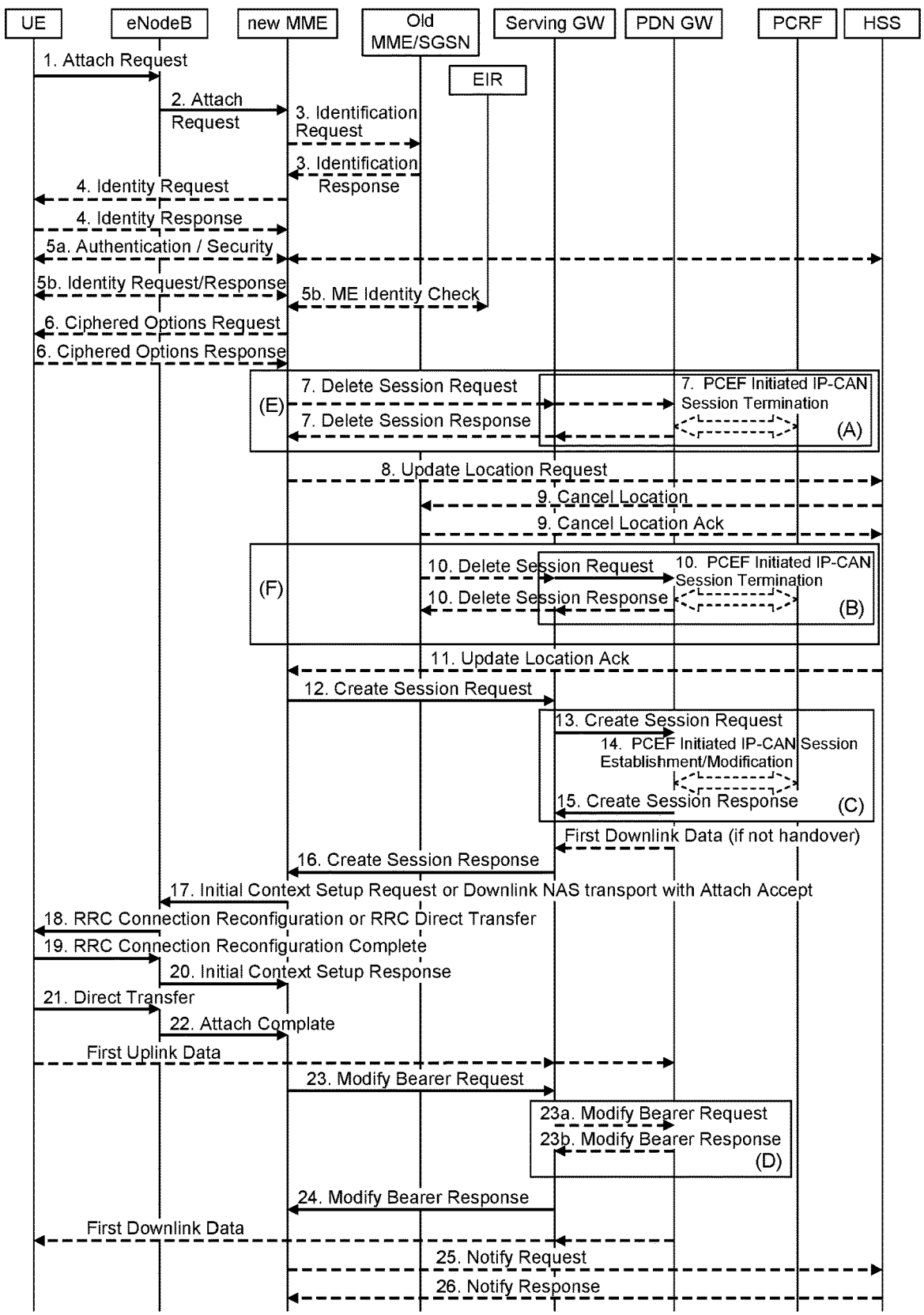
FIG. 2 shows the Attach procedure as defined by 3GPP.

UE 100 has roamed to an area outside the coverage of its Home Network and has access to Visited Network A 120 and Visited Network B 130. UE 100 connects to Visited Network A 120 initially due to handset policies or stored preferences. UE 100 and the affected network entities then follow the Attach procedure as outlined in FIG. 2. During the Identity Request/Response exchange, UE 100 provides its ME Identity as IMEI.A which the MME (Mobility Management Entity) in visited network A 120 will eventually forward to HSS 110 as part of the Update_Location_Request message.

Here HSS 110 stores the value of IMSI concatenated with IMEI.A as a composite key for the entry, updating and replacing the previous entry if it exists.

At this time, UE 100 decides to make a simultaneous connection to visited network B 130 with its other radio interface. It follows the same Attach procedure described in FIG. 2 however, it provides IMEI.B as its ME Identity during the Identity Request/Response exchange. Then the MME forwards this information to HSS 110 as part of the Update_Location_Request message.

HSS 110 notes the request is for an IMSI which has an existing entry but a different ME Identity value. Assuming that the IMSI is authorised for simultaneous connections, HSS 110 proceeds to create a second composite key (IMSI concatenated with IMEI.B) and adds a second entry in its database for UE 100. At this point, UE is able to simultaneously and independently roam across Visited Network A and Visited Network B using its two radio interfaces.

Figure 3:
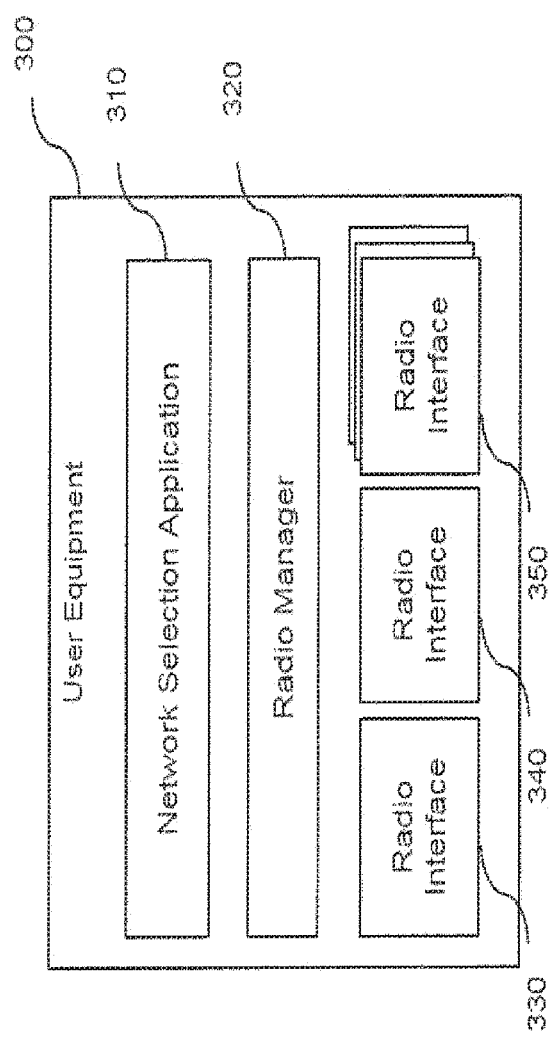
FIG. 3 illustrates a functional block diagram of the User Equipment.

A functional block diagram of the pertinent entities within UE 100 is shown in FIG. 3. UE 300 consists of radio interfaces 330, 340 and possibly more. For the purposes of this invention, each interface capable of making an independent 3GPP defined radio connection is issued with a unique ME identity or IMEI number. Hence, for the described scenario in FIG. 1, UE 100 was issued IMEI.A for radio interface 330 and IMEI.B for radio interface 340. The Radio Manager 320 is the functionality responsible for managing the radio interfaces and responding with the correct IMEI number to be used for 3GPP defined communications over each respective interface. This is especially important in the event that the respective radio interfaces are virtual in nature. The Network Selection Application 310 is visualised as an interface allowing either the home network or the user to select an appropriate network to connect to. The home network may provide a list or policy for selection of candidate networks for connection. A user or application interface may also be provided for the user to make a choice as to the network or networks to be connected to as well as decision on type of traffic to be routed on each network. As an implementation example, visited network A may be selected for voice calls and visited network B may be selected for video streaming services. These may be due to reasons such as pricing models or service exclusivity.

The flowchart for the behaviour of HSS 110 is shown in FIG. 4. At the Start 400, the HSS is operating normally. It receives an Update_Location_Request (step 410) from a MME and retrieves the IMSI which is the primary key used for its database entries. HSS 110 which implements the solution, specifically also searches for composite key (step 420) comprising the concatenation of the IMSI and IMEI values. If the composite key is found, HSS 110 will understand this to be a normal location update triggered by the movement of UE 100 and proceeds with the usual procedures of location update (step 430) as defined in NPL 1. In the event that the composite key is not found, even if another existing IMSI entry exists, HSS 110 will understand this to be a new additional, simultaneous connection made by UE 100 (step 440). HSS 110 then proceeds to create a new entry and populate its database with the relevant information from the Update_Location_Request message.

The home service provider may have policies that govern how many simultaneous connections a subscriber is allowed to make. One implementation would be to have a variable value, Maximum_Simultaneous_Connections, with an integer value denoting the maximum number of simultaneous connections that the subscriber is allowed to make. Hence when the HSS creates a new composite key for UE 100, it would first run a check for the number of (IMSI+IMEI/IMEISV) composite keys entries and compare it to the value of Maximum_Simultaneous_Connections. In the event that the number of composite keys have equalled or exceeded the value of Maximum_Simultaneous_Connections, the new connection is denied.

In this case, this will limit the number of (IMSI+IMEI/IMEISV) composite keys that each IMSI is allowed to have. However, this implementation is trivial and does not impact the operation of the invention. It should also be mentioned that this is not the only way for this invention to be implemented in the HSS. For the purposes of efficiency or optimisation, it is also possible that certain fields in the data are the same for all instances of (IMSI+IMEI/IMEISV) composite keys and the implementer may choose a different table structure for the HSS database. However, such variation is normal and does not impact the operation of this invention. The advantage of utilising (IMSI+IMEI/IMEISV) as a composite key is so that the format of existing table can be preserved. It is also trivial to replace the usage of IMSI as a prime key to (IMSI+IMEI/IMEISV) as the (composite) prime key with no impact to the rest of the processing.

It is possible that some UEs are capable of simultaneous, multiple 3GPP connections even though they only have a single 3GPP radio interface. This may have been achieved via some form of scheduling or optimisation. In such cases, this invention is still applicable when each simultaneous virtual connection is issued with a valid, unique IMEI. The manufacturer will have to assign the range of allowable IMEI for the UE but the specific IMEI used for each connection may be then be arbitrarily chosen by software.

It should be noted that the invention is described in the scenario where the user equipment is connected to visited networks, this should not be taken as a limitation to the operation of the solution. The invention may be utilised with any combination of home or visited networks as well as physical or virtual radio interfaces with no significant changes to its procedures.

In the foregoing embodiments, the present disclosure is configured with hardware by way of the above explained example, but the present disclosure may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The invention claimed is:

1. A method performed by a user equipment, the method comprising:
   obtaining a plurality of unique mobile equipment identities;
   assigning respective ones of the unique mobile equipment identities to a plurality of radio interfaces of the user equipment; and
   performing a plurality of simultaneous connections to multiple cellular networks based on a plurality of associations of a single subscriber identity and the unique mobile equipment identities respectively assigned to the radio interfaces of the user equipment,
   wherein the single subscriber identity is an International Mobile Subscriber Identity (IMSI) stored in a subscriber identity module (SIM) card, and
   wherein each of the unique mobile equipment identities is an International Mobile Equipment Identifier (IMEI) assigned by a manufacturer of a mobile device the radio interfaces of the user equipment.

2. The method according to claim 1, wherein the associations include a first association that comprises the IMSI concatenated with a first IMEI assigned to a first radio connection, and a second association that comprises the IMSI concatenated with a second IMEI assigned to a second radio connection.

3. The method according to claim 1, wherein the simultaneous connections comprise a connection with at least one of a visited network and a home network.

4. A user equipment comprising:
   a plurality of radio interfaces, wherein a unique mobile equipment identity is assigned to each of the radio interfaces by a radio manager; and
   circuitry which, in operation, establishes simultaneous connections to multiple cellular networks, via the interface, based on a plurality of associations of a single subscriber identity and the unique mobile equipment identities receptively assigned to each of the radio interfaces,
   wherein the single subscriber identity is an International Mobile Subscriber Identity (IMSI) stored in a subscriber identity module (SIM) card, and
   wherein each of the unique mobile equipment identities is an International Mobile Equipment Identifier (IMEI) assigned by a manufacturer of the radio interfaces.

5. The user equipment according to claim 4, wherein the connected interface is a virtual interface.

6. The user equipment according to claim 4, wherein the associations include a first association that comprises the IMSI concatenated with a first IMEI assigned to a first radio connection, and a second association that comprises the IMSI concatenated with a second IMEI assigned to a second radio connection.

7. The user equipment according to claim 4, wherein the simultaneous connections comprise a connection with at least one of a visited network and a home network.

8. A Home Subscriber Server (HSS) comprising:
   storage circuitry which, in operation, associates a single subscriber identity with a plurality of unique mobile equipment identities assigned to each of a plurality of radio interfaces of a user equipment, and stores the associations;
   management circuitry which, in operation, manages simultaneous connections of the user equipment to multiple cellular networks based on the stored associations of the single subscriber identity and the unique mobile equipment identities assigned to each of the radio interfaces,
   wherein the single subscriber identity is an International Mobile Subscriber Identity (IMSI) stored in a subscriber identity module (SIM) card,
   wherein each of the unique mobile equipment identities is an International Mobile Equipment Identifier (IMEI) assigned by a manufacturer of the radio interfaces of the user equipment, and
   wherein the associations include a first association that comprises the IMSI concatenated with a first IMEI assigned to a first radio interface, and a second association that comprises the IMSI concatenated with a second IMEI assigned to a second radio interface.

9. The HSS according to claim 8, wherein the storage circuitry stores policies to allow or deny the simultaneous connections.

* * * * *